United States Patent
Esswie

(10) Patent No.: US 12,483,923 B2
(45) Date of Patent: Nov. 25, 2025

(54) DELAY-AWARE TRANSMISSION POINT SELECTION

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 18/434,256

(22) Filed: Feb. 6, 2024

(65) Prior Publication Data

US 2025/0254559 A1    Aug. 7, 2025

(51) Int. Cl.
*H04W 28/02* (2009.01)
*H04W 28/06* (2009.01)

(52) U.S. Cl.
CPC ............... *H04W 28/0236* (2013.01); *H04W 28/0278* (2013.01); *H04W 28/06* (2013.01)

(58) Field of Classification Search
CPC ......... H04W 28/0236; H04W 28/0278; H04W 28/06; H04W 28/0242; H04W 28/0284
USPC ........................................................ 709/238
See application file for complete search history.

(56) References Cited

U.S. PATENT DOCUMENTS

| | | | |
|---|---|---|---|
| 2022/0015070 A1* | 1/2022 | Chen | H04W 72/1263 |
| 2024/0314632 A1* | 9/2024 | Esswie | H04L 1/1642 |
| 2024/0381159 A1* | 11/2024 | He | H04L 47/32 |
| 2025/0056409 A1* | 2/2025 | Maamari | H04W 76/28 |
| 2025/0106844 A1* | 3/2025 | Kang | H04W 72/1221 |

OTHER PUBLICATIONS

"3rd Generation Partnership Project; Technical Specification Group Services and System Aspects; Release 17 Description; Summary of Rel-17 Work Items (Release 17)" 3GPP TR 21.917 V17.0.1, Jan. 2023, 167 pages.

* cited by examiner

*Primary Examiner* — Sargon N Nano
(74) *Attorney, Agent, or Firm* — Amin, Turocy & Watson, LLP

(57) ABSTRACT

An extended reality appliance may receive a configured interlink offset value corresponding to transmission delay between the appliance and an extended reality processing unit, which may facilitate relaying of traffic between the appliance and a radio access network node. The appliance may determine a transmission delay corresponding to transmission of traffic directly to the node. The appliance may determine a remaining delay budget corresponding to buffered traffic. If the appliance determines that the transmission delay plus the interlink offset value is greater than the remaining delay budget, the appliance may generate a partial buffer status report indicative only of buffered traffic corresponding to the remaining delay budget that is less than the transmission delay plus the interlink offset. The appliance may transmit the buffered traffic directly to the node according to resources granted by the node in response to the partial buffer status report.

20 Claims, 12 Drawing Sheets

DELAY-AWARE TRANSMISSION POINT SELECTION

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a first user equipment comprising at least one processor from a second user equipment, a protocol data unit discarding configuration comprising a pre-discarding delay offset. The method may comprise determining, by the first user equipment, an expected direct transmission time to transmit at least one protocol data unit, directed to a radio network node and corresponding to at least one traffic flow associated with the first user equipment, from the first user equipment to the radio network node to result in a determined direct transmission time and determining, by the first user equipment, an amount of time that the at least one protocol data unit has been buffered in a memory corresponding to the first user equipment to result in a determined buffered time amount. Based on the determined buffered time amount and a delay budget corresponding to the at least one traffic flow, the method may further comprise determining, by the first user equipment, a remaining delay budget corresponding to the at least one protocol data unit. The method may further comprise analyzing, by the first user equipment, the remaining delay budget with respect to the determined direct transmission time and the pre-discarding delay offset to result in an analyzed remaining delay budget. Based on the analyzed remaining delay budget being determined not to exceed the determined direct transmission time and the pre-discarding delay offset, the method may further comprise determining, by the first use equipment, to avoid transmitting the at least one protocol data unit to the second user equipment for relay thereby to the radio network node and transmitting, by the first user equipment to the radio network node, the at least one protocol data unit.

The pre-discarding delay offset may be based on a relay delay corresponding to relaying, by the second user equipment, of traffic between the first user equipment and the radio network node.

In an embodiment, the method may further comprise determining, by the first user equipment: a preparation delay corresponding to preparing, by the first user equipment, the at least one protocol data unit for transmission; an encoding delay corresponding to encoding, by the first user equipment, the at least one protocol data unit; or a transmission delay, corresponding to transmitting, by the first user equipment, the at least one protocol data unit to the radio network node. The expected direct transmission time may be based on at least one of the preparation delay, the encoding delay, or the transmission delay.

In an embodiment, the first user equipment may be an extended reality appliance and the second user equipment may be an extended reality processing unit that may be configured to facilitate relaying of traffic directed to the radio network node by the first user equipment or to facilitate relaying of traffic directed to the first user equipment by the radio network node.

In an embodiment, the at least one protocol data unit may comprise a first protocol data unit corresponding to a first traffic flow of the at least one traffic flow. The delay budget may be a first delay budget. The remaining delay budget may be a first remaining delay budget. The analyzed remaining delay budget may be a first analyzed remaining delay budget. The determined buffered time amount may be a first determined buffered time amount. The method may further comprise determining, by the first user equipment, a second amount of time that a second protocol data unit, corresponding to a second traffic flow of the at least one traffic flow, has been buffered in the memory to result in a second determined buffered time amount. Based on the second determined buffered time amount and a second delay budget corresponding to the second traffic flow, the method may further comprise determining, by the first user equipment, a second remaining delay budget corresponding to the second protocol data unit and analyzing, by the first user equipment, the second remaining delay budget with respect to the determined direct transmission time and the pre-discarding delay offset to result in a second analyzed remaining delay budget. Based on the second analyzed remaining delay budget being determined to equal or exceed the determined direct transmission time and the pre-discarding delay offset, the method may further comprise determining, by the first user equipment, to transmit the second protocol data unit to the second user equipment for relay thereby to the radio network node and transmitting, by the first user equipment to the second user equipment, the second protocol data unit.

The first delay budget may correspond to a first quality-of-service associated with the first traffic flow. The second delay budget may correspond to a second quality-of-service associated with the second traffic flow. The first delay budget and the second delay budget may be different. The pre-discarding delay offset used in the analyzing of the first remaining delay budget with respect to the determined direct transmission time to result in the first analyzed remaining delay budget may be a first pre-discarding delay offset. The pre-discarding delay offset used in the analyzing of the second remaining delay budget with respect to the determined direct transmission time to result in the second analyzed remaining delay budget may be a second pre-discarding delay offset. The first pre-discarding delay offset may correspond to a first quality-of-service associated with the first traffic flow. The second pre-discarding delay offset may correspond to a second quality-of-service associated with the second traffic flow.

In an embodiment, the method may further comprise, based on the analyzed remaining delay budget being determined not to equal or exceed the determined direct transmission time and the pre-discarding delay offset, directing, by the first user equipment to the radio network node, a partial buffer status report comprising at least one traffic flow volume indication indicative of at least the first protocol data unit or the second protocol data unit that have been buffered in the memory. Responsive to the transmitting of the partial buffer status report, the method may further comprise receiving, by the first user equipment, a scheduled uplink resource message comprising at least one first uplink resource indication indicative of at least one first uplink resource, usable by the first user equipment, to facilitate the transmitting of the first protocol data unit to the radio network node.

In an embodiment, based on the analyzed remaining delay budget being determined not to exceed the determined direct transmission time and the pre-discarding delay offset, the method may further comprise transmitting, by the first user equipment to the radio network node, a partial buffer status report comprising a traffic flow volume indication indicative of the at least one protocol data unit that has been buffered in the memory. Responsive to the transmitting of the partial buffer status report, the method may further comprise receiving, by the first user equipment from the radio network node, a scheduled uplink resource message comprising at least one uplink resource indication indicative of at least one uplink resource, usable by the first user equipment, to facilitate the transmitting of the at least one protocol data unit to the radio network node.

In an embodiment, based on the analyzed remaining delay budget being determined not to exceed the determined direct transmission time and the pre-discarding delay offset, the method may further comprise transmitting, by the first user equipment to the radio network node, a partial buffer status report comprising a traffic flow volume indication indicative of the at least one protocol data unit that has been buffered in the memory. Responsive to the transmitting of the partial buffer status report, the method may further comprise receiving, by the first user equipment from the second user equipment, a scheduled uplink resource message comprising at least one uplink resource indication indicative of at least one uplink resource, usable by the first user equipment, to facilitate the transmitting of the at least one protocol data unit to the radio network node.

In an embodiment, based on the analyzed remaining delay budget being determined not to exceed the determined direct transmission time and the pre-discarding delay offset, the method may further comprise transmitting, by the first user equipment to the second user equipment, a partial buffer status report comprising a traffic flow volume indication indicative of the at least one protocol data unit that has been buffered in the memory. Responsive to the transmitting of the partial buffer status report, the method may further comprise receiving, by the first user equipment from the radio network node, a scheduled uplink resource message comprising at least one uplink resource indication indicative of at least one uplink resource, usable by the first user equipment, to facilitate the transmitting of the at least one protocol data unit to the radio network node.

In an embodiment, based on the analyzed remaining delay budget being determined not to exceed the determined direct transmission time and the pre-discarding delay offset, the method may further comprise transmitting, by the first user equipment to the second user equipment, a partial buffer status report comprising a traffic flow volume indication indicative of the at least one protocol data unit that has been buffered in the memory. Responsive to the transmitting of the partial buffer status report, the method may further comprise receiving, by the first user equipment from the second user equipment, a scheduled uplink resource message comprising at least one uplink resource indication indicative of at least one uplink resource, usable by the first user equipment, to facilitate the transmitting of the at least one protocol data unit to the radio network node.

In another example embodiment, a first user equipment may comprise at least one processor configured to process executable instructions that, when executed by the at least one processor, facilitate performance of operations that may comprise receiving a packet discarding configuration comprising a pre-discarding delay offset corresponding to a relay time associated with relaying, by a second user equipment, traffic between the first user equipment and a radio network node. The operations may further comprise determining an expected direct transmission time to transmit at least one packet, directed to the radio network node and corresponding to at least one logical channel group associated with the first user equipment, from the first user equipment to the radio network node to result in a determined direct transmission time and determining an amount of time that the at least one packet has been buffered in a memory corresponding to the first user equipment to result in a determined buffered time amount. Based on the determined buffered time amount and a delay budget corresponding to the at least one logical channel group, the operations may further comprise determining a remaining delay budget corresponding to the at least one packet and analyzing the remaining delay budget with respect to the determined direct transmission time and the pre-discarding delay offset to result in an analyzed remaining delay budget. Based on the analyzed remaining delay budget failing to exceed the determined direct transmission time summed with the pre-discarding delay offset, the operations may further comprise determining to avoid transmitting the at least one packet to the second user equipment for relay thereby to the radio network node and transmitting, to the radio network node, the at least one packet. The packet discarding configuration may be received from the second user equipment or the radio network node.

Based on the analyzed remaining delay budget failing to exceed the determined direct transmission time summed with the pre-discarding delay offset, the operations may further comprise directing to the radio network node, a partial buffer status report comprising at least one logical channel group volume indication indicative of the at least one packet that has been buffered in the memory. Responsive to the transmitting of the partial buffer status report, the operations may further comprise receiving a scheduled uplink resource message comprising at least one uplink resource indication indicative of at least one uplink resource, usable by the first user equipment, to facilitate the transmitting of the at least one packet to the radio network node.

The directing to the radio network node of the partial buffer status report may comprise one of: transmitting to the partial buffer status report to the radio network node or transmitting the partial buffer status report to the second user equipment for relay thereby to the radio network node. The receiving of the scheduled uplink resource message may comprise one of receiving the scheduled uplink resource message from the radio network node, or receiving the scheduled uplink resource message from the second user equipment. The second user equipment may receive the scheduled uplink resource message from the radio network node and may relay the scheduled uplink resource message to the first user equipment.

In yet another example embodiment, non-transitory machine-readable medium may comprise executable instructions that, when executed by at least processor of an extended reality appliance, facilitate performance of operations that may comprise receiving a packet data unit discarding configuration comprising a pre-discarding delay offset, determining an expected direct transmission time to transmit at least one packet, directed to a radio network node and corresponding to at least one logical channel group associated with the extended reality appliance, from the extended reality appliance to the radio network node to result in a determined direct transmission time, and determining an amount of time that the at least one packet has been buffered in a memory corresponding to the extended reality appliance to result in a determined buffered time amount. Based on the determined buffered time amount and a delay budget corresponding to the at least one logical channel group, the operations may further comprise determining a remaining delay budget corresponding to the at least one packet and analyzing the remaining delay budget with respect to the determined direct transmission time and the pre-discarding delay offset to result in an analyzed remaining delay budget. Based on the analyzed remaining delay budget failing to exceed the determined direct transmission time summed with the pre-discarding delay offset, the operations may further comprise determining to avoid transmitting the at least one packet to an extended reality processing unit for relay thereby to the radio network node, and transmitting, to the radio network node, the at least one packet.

The at least one packet may be a first packet corresponding to a first logical channel group of the at least one logical channel group. The delay budget may be a first delay budget. The remaining delay budget may be a first remaining delay budget. The analyzed remaining delay budget may be an analyzed first remaining delay budget. The determined buffered time amount may be a determined first buffered time amount. The operations may further comprise determining a second amount of time that a second packet, corresponding to a second logical channel group of the at least one logical channel group, has been buffered in the memory to result in a determined second buffered time amount. Based on the determined second buffered time amount and a second delay budget corresponding to the second logical channel group, the operations may further comprise determining a second remaining delay budget corresponding to the second packet and analyzing the second remaining delay budget with respect to the determined direct transmission time and the pre-discarding delay offset to result in an analyzed second remaining delay budget. Based on the analyzed second remaining delay budget failing to equal or exceed the determined direct transmission time summed with the pre-discarding delay offset, the operations may further comprise determining to avoid transmitting the second packet to the extended reality processing unit for relay thereby to the radio network node and transmitting, to the radio network node, the second packet.

Based on the analyzed first remaining delay budget or the analyzed second remaining delay budget failing to equal or exceed the determined direct transmission time summed with the pre-discarding delay offset, the operations may further comprise directing, to the radio network node, a partial buffer status report comprising at least one logical channel group volume indication indicative of at least the first packet or the second packet that have been buffered in the memory. Responsive to the transmitting of the partial buffer status report, the operations may further comprise receiving a scheduled uplink resource message comprising at least one first uplink resource indication indicative of at least one first uplink resource, usable by the extended reality appliance, to facilitate the transmitting of the first packet to the radio network node and comprising at least one second uplink resource indication indicative of at least one second uplink resource, usable by the extended reality appliance, to facilitate the transmitting of the second packet to the radio network node.

DETAILED DESCRIPTION

Figure 1:
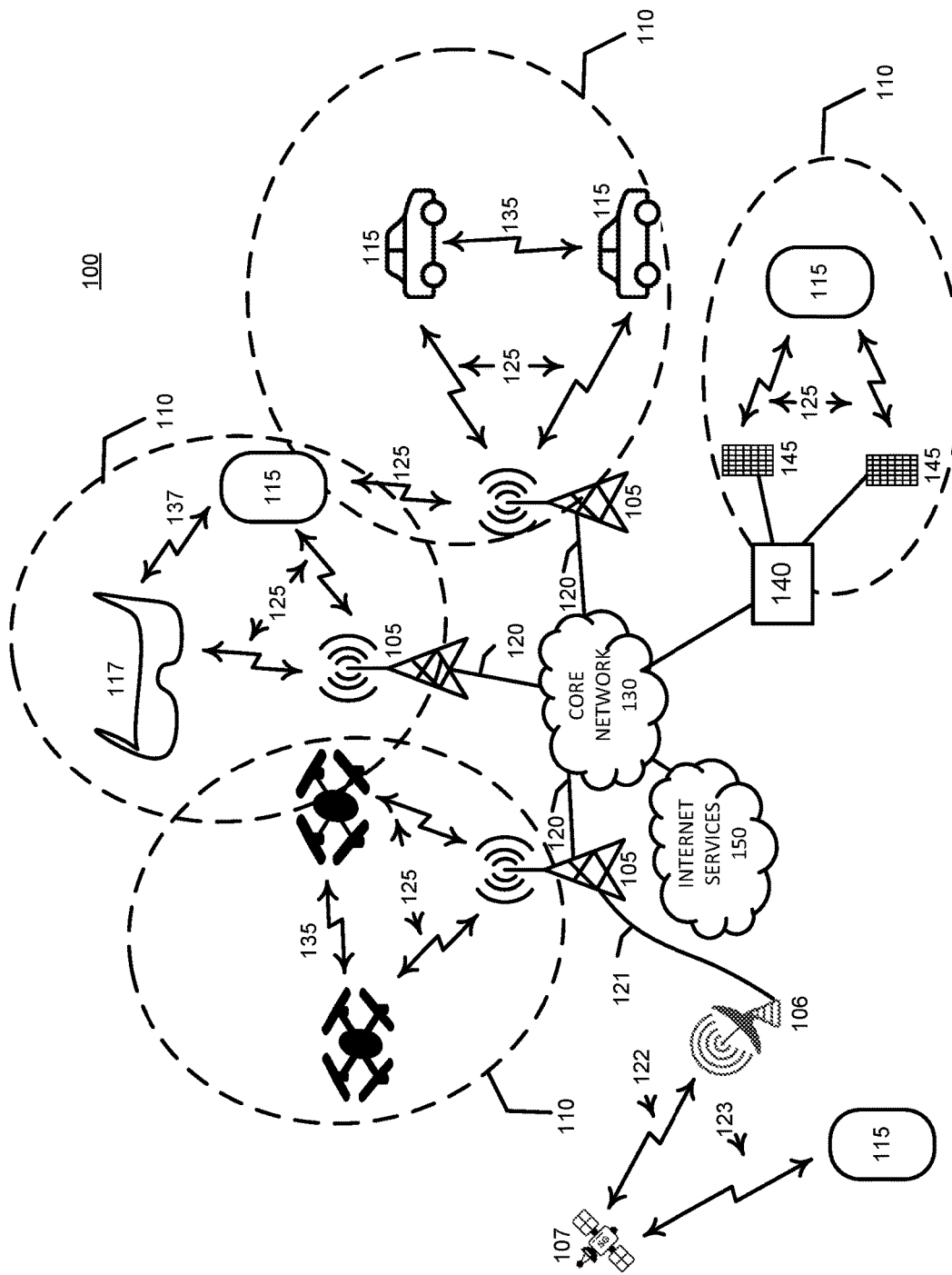
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'extended reality' ("XR") services. XR services may refer to, or may be referred to as, anything reality services. XR services may comprise VR applications, which are widely adopted XR applications that provide an immersive environment that can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed Reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling a user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at an XR capable device is desirable. Accordingly, a user equipment device accessing XR services, or traffic flows of an XR session, may be associated with certain QoS parameter criterion/criteria to satisfy performance targets of the XR service. Measured traffic values, or metrics, may correspond to a QoS, or analyzed with respect to, parameter criterion/criteria, such as, for example, a data rate, an end-to-end latency, or a reliability.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Multi-modal XR applications may integrate different technologies to offer a versatile and comprehensive user experience. For example, a multi-modal XR application might use VR to immerse users in a virtual training environment and then seamlessly switch to AR or MR to provide real-time feedback or overlay instructional information corresponding to physical objects that may appear in an environment viewed by an XR user. Such feedback or instructional information may relate to stationary objects or may be information that does not change frequently and may be referred to as stable information.

An advantage of multi-modal XR applications is the adaptability to facilitate different contexts and different user preferences. An XR application can provide varying levels of immersion and interaction, allowing users to choose the most suitable mode of engagement based on the user's needs or the specific task at hand. Additionally, multi-modal XR can enable collaborative experiences, allowing users in different physical locations to interact within the same virtual space.

Uses of multi-modal XR applications extend beyond entertainment and gaming, with widespread adoption in fields such as healthcare, education, engineering, and marketing. Medical practitioners can use multi-modal XR applications to simulate complex surgeries, educators can create interactive and immersive learning experiences, and architects can visualize and modify building designs in real-time.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, laptop computers, tablet computers, automobiles or other vehicles, or drones or other aircraft. Another example of a UE may be a virtual reality/extended reality appliance 117, such as smart glasses, a virtual reality headset, an augmented reality headset, and other similar devices that may provide images, video, audio, touch sensation, taste, or smell sensation to a wearer. A UE, such as XR appliance 117, may transmit or receive wireless signals with a RAN base station 105 via a long-range wireless link 125, or the UE/XR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a RAN base station 105 and over a short-range wireless link. XR appliance 117 may also communicate with a wireless UE via a cable, or other wired connection. An XR appliance 117 may offload processing functionality or functionality related to communicating with a RAN, to a user equipment 115, which may be referred to as an intermediate user equipment or an XR processing unit. An XR processing unit or a RAN, or a component thereof, may be implemented by one or more computer components that may be described in reference to FIG. 11. An XR processing unit may also comprise components described in reference to FIG. 12

Continuing with discussion of FIG. 1, base stations 105, which may be referred to as radio access network nodes or cells, may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (cMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
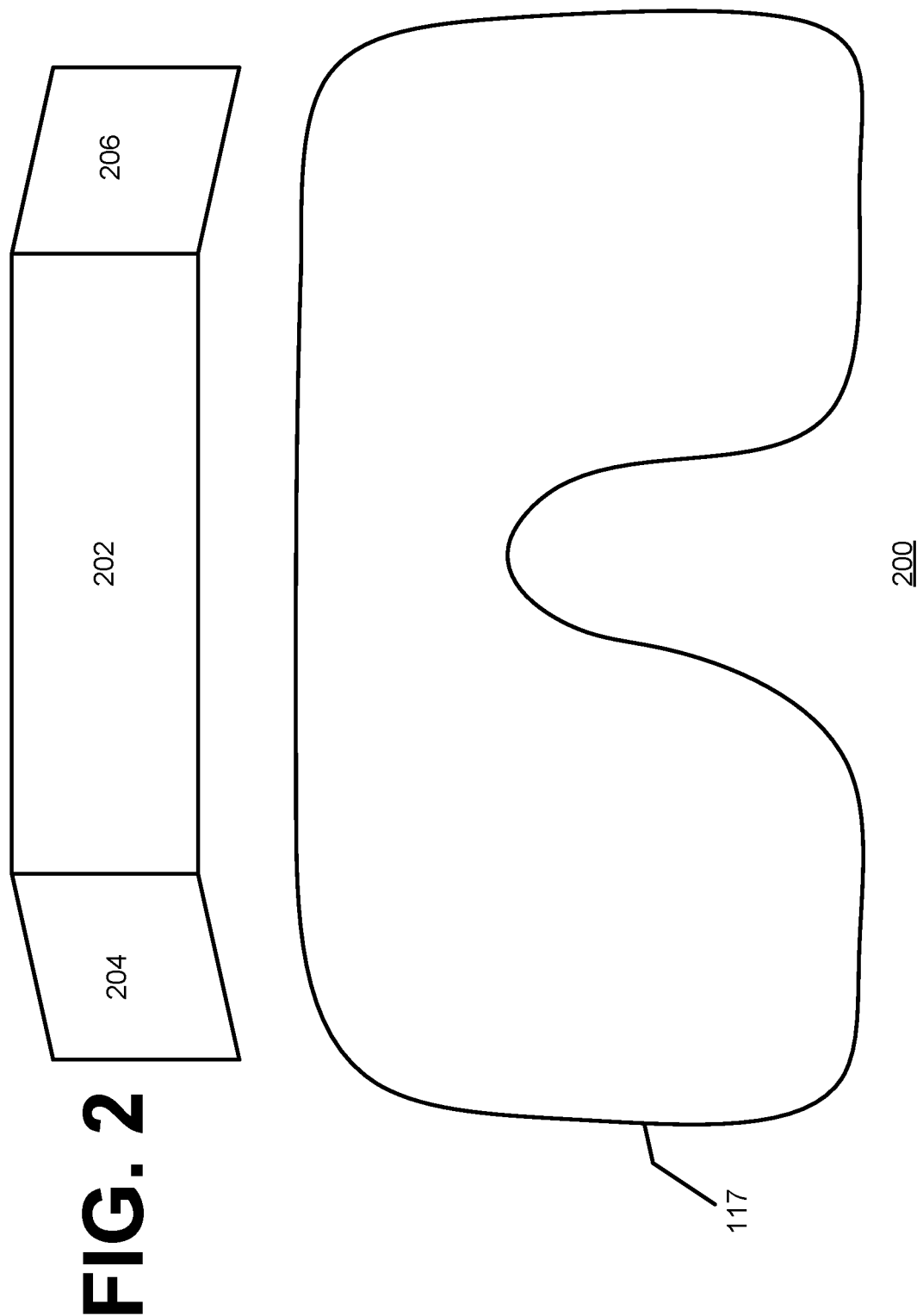
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or cMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined with respect to XR data traffic: (1) XR traffic characteristics are typically periodic with time-varying packet size and packet arrival rate; (2) XR capable devices (e.g., smart glasses, projection wearables, etc.) may be more power-limited than conventional mobile handsets, due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user equipment device may be associated with certain QoS parameter criterion/criteria with respect to which measured values, or metrics, corresponding to traffic flows that facilitate XR service may be analyzed. Adjusting scheduling of traffic such that a measured traffic flow metric satisfies a QoS parameter, such as, for example, a data rate, an end-to-end latency, or a reliability may be beneficial to a user's XR experience.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

In an embodiment, a user equipment may be deployed as an extended reality processing unit and may facilitate communication with a RAN node on behalf of a less capable end XR appliance (e.g., less capable in terms of processing power, battery capacity, transmitter power, or the like). An extended reality processing unit may comprise an 'in-box' processing unit/device that facilitates signaling, traffic handling, and overall radio assistance to an end XR appliance (e.g., helmets, or glasses), which may be capable of communicating directly with a RAN node but with reduced capability. Accordingly, an intermediate XR processing unit (e.g., a laptop or smartphone that is intermediate with respect to communication links between a RAN node and an end XR appliance) may facilitate relaxing a large subset of radio function and operations, traffic processing, and battery consumption load with respect to an end XR appliance thus leading to a more efficient end XR device design (e.g., requiring less battery size, dissipating less heat, etc.).

Figure 3:
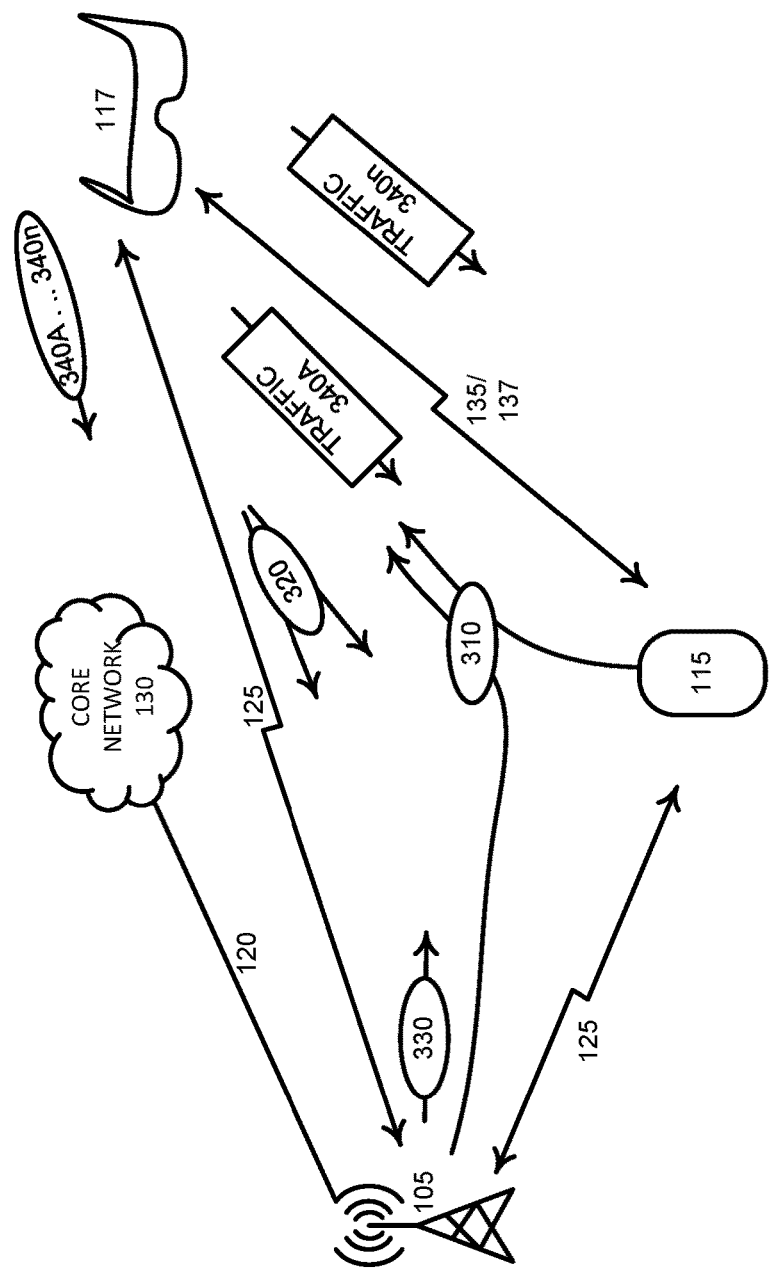
FIG. 3 illustrates an example environment with an anything reality appliance tethered to a user equipment.

Turning now to FIG. 3, the figure illustrates an example environment 300 with an extended reality appliance 117 tethered to an extended reality processing unit user equipment 115. Appliance 117 may be referred to as an end XR appliance in reference to the relationship of being at an end of a communication session, with respect to RAN node 105, with extended reality processing unit 115 being located intermediate to the RAN node and the appliance. XR processing unit 115 may be more capable with respect to battery capacity (or may be supplied power via a wired power supply receiving power from an electrical wall outlet), or with respect to processing capability, than XR appliance 117. In an embodiment, a downlink traffic flow providing traffic to a peripheral portion 204/206 (shown in FIG. 2) of VR/XR appliance 117 may be related to a downlink traffic flow carrying traffic to be displayed by a pose portion 202 of the appliance. In another example, two different traffic flows may respectively carry traffic directed to right side 202R and left side 202L of pose portion 202 and thus may be related. In another example, an uplink traffic flow may carry traffic related to a downlink traffic flow.

Facilitating extended reality services via cellular wireless communications may negatively impact spectral efficiency or energy consumption at RAN nodes or user equipment due to stringent combined requirements regarding capacity, latency, and reliability, one or more of which may tend to impose contradictory requirements with respect to one or more of the other requirements. For example, to facilitate capacity and video rendering requirements corresponding to many XR applications, advanced multi-antenna system, sophisticated processing, and larger battery capacities may be used at end XR devices/appliance, which may cause an increase in weight and heat generated and may detract from appearance of an end XR device/appliance (e.g., XR glass, helmet, or bracelet, etc.).

Deployment of a high-capability (with respect to an XR appliance 117) intermediate XR processing unit 115 between RAN node 105 and a XR appliance processing unit may facilitate relaying part of, or all of, XR radio traffic to or from the end XR device/appliance, thus reducing radio burden from the end XR appliance and facilitating the XR appliance being lower capability and lower weight than if the XR processing unit is not available to facilitate relaying of XR traffic between the appliance and RAN node. Burdens that may be offloaded from an end XR appliance 117 to intermediate XR processing unit 115 may comprise, for example, local traffic storage, processing of heavy control channel decoding, XR local video rendering, or advanced radio antenna manipulation. Thus, advanced receiver and processing capability may be facilitated for critical XR services with respect to an XR appliance 117, which may be lighter, more aesthetically pleasant, and more efficient than if the end XR appliance is not designed with capability to offload the burdens to intermediate XR processing unit 115.

Conventional techniques may implement capacity-beneficial packet skipping procedures that facilitate user equipment skipping transmission of non-useful packets. According to conventional techniques, when an XR protocol data unit, for example a packet, associated with a traffic flow, buffered in a buffer corresponding to a device for a period such that the device determines that the packet will likely not be delivered (e.g., delivered to a RAN node) according to a latency budget corresponding to the traffic flow, the packet may be deemed non-useful and transmission of the packet may be 'skipped' or the packet may be dropped from the buffer to avoid use of radio interface to transmit a non-useful packet, thus minimizing waste of scheduled radio resources.

While using an intermediate XR processing unit, packets associated with extended reality services may be generated at an end XR device/appliance 117 but relayed, buffered, and actually transmitted by intermediate processing unit 115, which may disrupt tracking and reporting of packets to be skipped, which may in turn result in invalidating, disrupting, or reducing efficiency of conventional packet skipping behaviour at a user equipment and may also result in invalidating, disrupting, or reducing efficiency of uplink resource scheduling behaviour at a RAN node serving the XR processing unit and the end XR appliance.

Transmission of a protocol data unit ("PDU") (e.g., a packet) may be skipped due to misalignment of uplink resource grants with respect to the generations of packets and delay budgets associated with a user equipment device. According to embodiments disclosed herein, adaptive, multi-device-coordinated PDU skipping may facilitate minimizing a number of PDU transmissions that are skipped while facilitating controlling PDU skipping of packets that that are unable to be transmitted in a timely manner (e.g., uplink traffic packets buffered by one or more user equipment, for example an XR processing unit 115 and an end XR appliance 117, cannot be transmitted to be delivered to a device or application to which the packets are direct within a delay budget associated with the packets). According to embodiments disclosed herein, end XR appliance 117, which may generate uplink traffic payload to be delivered, may become able to adaptively determine whether a buffered uplink packet can be timely relayed via XR processing unit 115 or whether, due to imminent expiration of a delay budget associated with a payload packet, to directly transmit the payload packet toward serving RAN node 105 to avoid PDU/packet skipping, which may be unnecessary if the payload packet can be timely transmitted (e.g., in satisfaction of a delay budget associated with the packet) via direct transmission to the RAN node. Such determination by an end XR appliance 117 whether to relay a buffered uplink traffic packet to RAN node 105 via XR processing unit 115 or to transmit the packet directly to the RAN node without the packet being relayed via the XR processing unit may be referred to as dynamic device-led transmission point selection.

Delay-Aware Transmission Point Selection.

Figure 4:
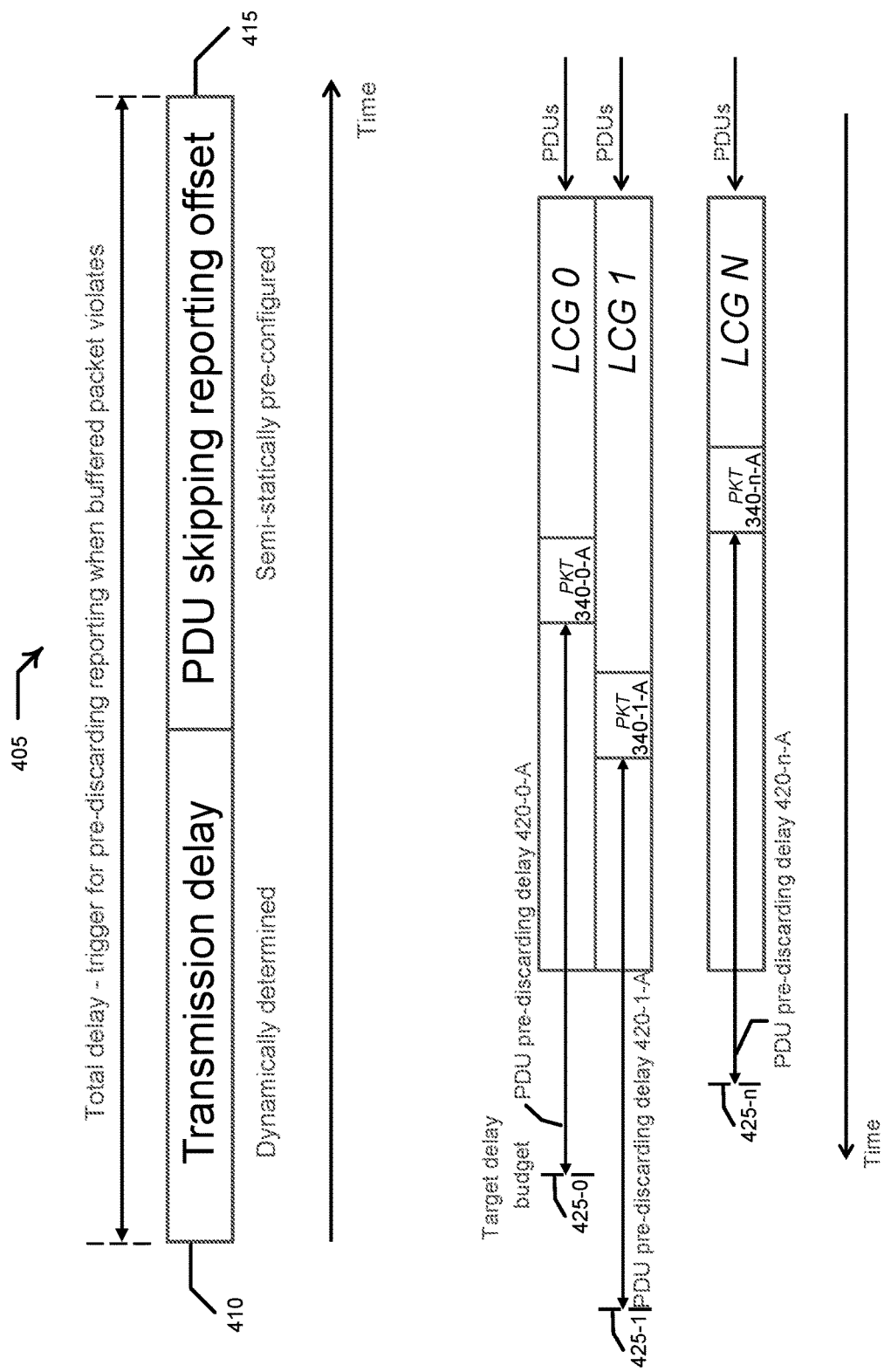
FIG. 4 illustrates an example packet pre-discarding delay applied to determined traffic transmission time by an extended reality appliance.

According to embodiments disclosed herein, end XR appliance 117 may receive, from serving RAN node 105 or from XR processing unit 115, a dynamic protocol data unit discarding configuration 310, which may comprise a pre-discarding delay offset value of a pre-discarding delay offset indication. The pre-discarding delay offset, shown as offset 415 in FIG. 4, may facilitate triggering of direct transmission to RAN node 105 by end XR appliance 117 of one or more packets associated with a traffic flow 340 corresponding to the end XR appliance. In an embodiment, different pre-discarding delay offset values 415 can be configured with respect to each of one or more logical channel group(s) ("LCG"). In an embodiment, a pre-discarding delay offset value 415 can be configured to be usable with respect to all LCGs corresponding to a current extended reality session associated with a user equipment group, which may comprise XR processing unit 115 and one or more appliances 117. A LCG may correspond to, or may be associated with, a traffic flow 340.

A configured pre-discarding delay offset 415 may be a semi-static delay offset value that corresponds to potential inter-device link delay associated with delivery of traffic between end XR appliance 117 and XR processing unit 115. A delay offset 415 may facilitate end XR device 117 in dynamically determining whether to transmit to RAN node 105 directly a packet corresponding to a flow 340 or whether to direct the packet to XR processing unit 115 for relay thereby to RAN node 105 to minimize, or avoid, discarding of the packet. End XR appliance 117 may calculate, or determine, a device-specific (e.g., with respect to the particular XR appliance) expected transmission delay corresponding to a buffered packet (e.g., an uplink traffic packet buffered by the appliance). The determined transmission delay value, (e.g., transmission delay 410 shown in FIG. 4) may comprise device preparation delay corresponding to processing of the packet by the XR appliance 117. Determined transmission delay value 410 may comprise an encoding delay. Determined transmission delay value 410 may comprise a transmission delay. Assuming availability of scheduled uplink resources to facilitate transmission of a buffered payload (e.g., a packet), determined transmission delay value 410 may correspond to, or represent, a total delay needed by XR appliance 117 to directly transmit the buffered payload towards the serving RAN node without relaying the buffered payload via XR processing unit 115.

End XR appliance 117 may calculate or determine a remaining delay budget with respect to a buffered traffic packet PDU/packet 340 corresponding to a logical channel group as being a target delay budget 425 minus a corresponding current buffering delay 420 associated with the PDU/packet. Current buffering delay 420 may correspond to an amount of time a traffic PDU/packet has been buffered by end XR appliance 117. Current buffering delay 420 may correspond to an amount of time between a PDU/packet being generated and a current time. Current buffering delay 420 may correspond to a current time at which a remaining delay budget is determined. Thus, a remaining delay budget with respect to a target delay budget 425 may be the same value as buffering delay 420 and thus reference to a remaining delay budget may be referred to as a remaining delay budget 420. The determined remaining delay budget may reflect an amount of time remaining before a buffered traffic packet 340 is deemed non-useful and transmission thereof is to be skipped. Thus, the determined remaining delay budget may take into account a target delivery time/budget minus a real-time buffering delay corresponding to the buffered packet. End XR appliance 117 may determine a worst (e.g., a smallest) PDU remaining delay budget with respect to one or more LCG(s) that may each comprise multiple buffered PDUs/packets. Determining a worst/smallest remaining delay budget associated with one or more packets corresponding to LCGs may comprise determining that transmission of one or more packets corresponding to the LCG to be the most likely of buffered packets 340 to be skipped because expiration of a remaining time budget associated with the LCG is the most imminent with respect to the other LCGs.

Figure 5:
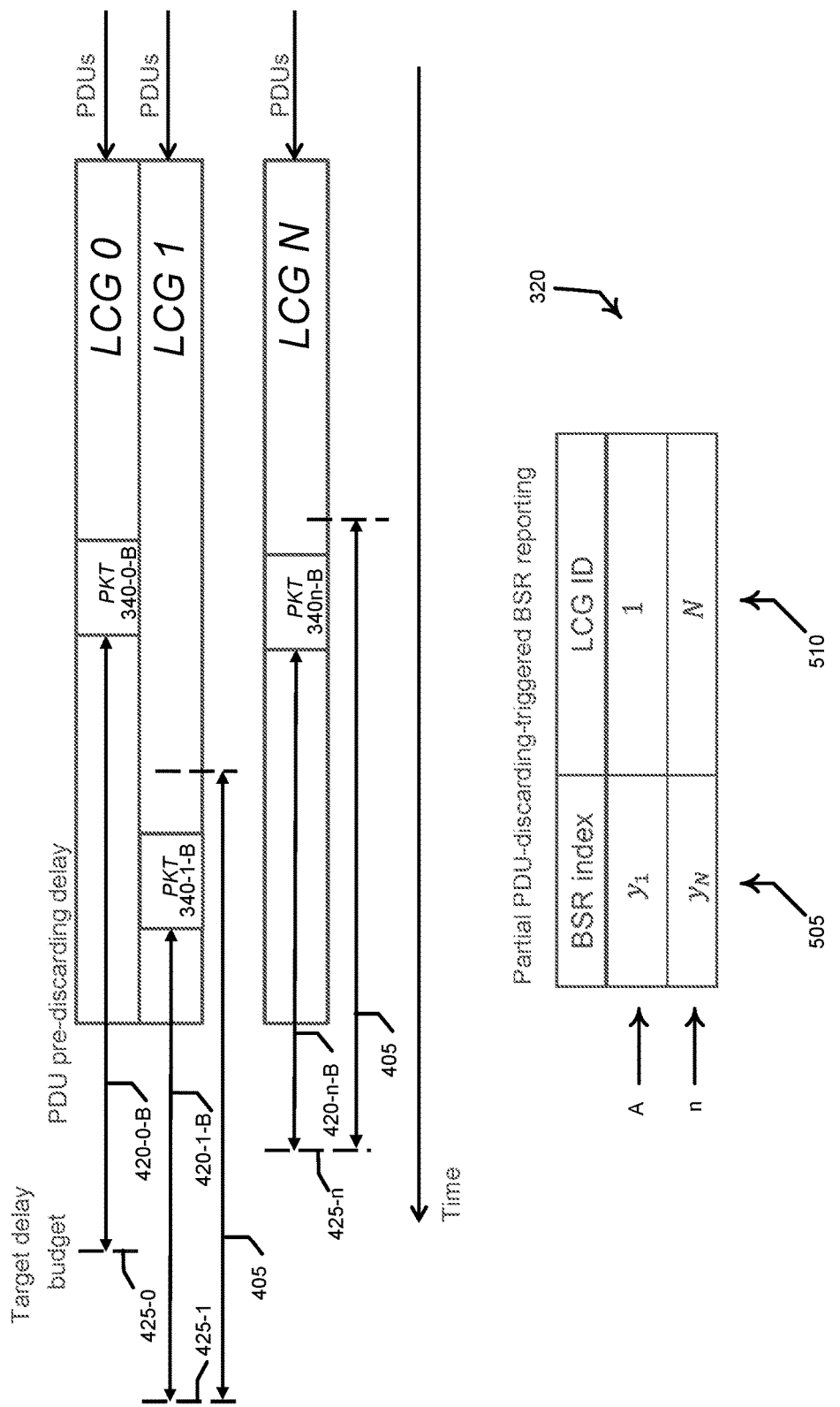
FIG. 5 illustrates example buffered packets corresponding to potential transmission via an extended reality processing unit according to a pre-discarding delay being indicated in a partial buffer status report.

Upon determining that an LCG is associated with a PDU/packet that corresponds to a worst/smallest remaining delay budget 420 being less than or equal total delay 405, end XR appliance 117 may determine to directly transmit to RAN node 105 buffered PDU(s)/packet(s) corresponding to the impacted LCGs instead of relaying the PDU(s)/packet(s) via intermediate processing unit 115. The XR appliance 117 may determine to directly transmit buffered packets corresponding to a remaining delay budget 420 being less than a total delay 405. As an example, remaining delay budget 420-1-B, corresponding to buffered packet 340-1-B is shown in FIG. 5 as being less than total delay 405, and remaining delay budget 420-$n$-B, corresponding to buffered packet 340-$n$-B, is shown as being less than total delay 405. By directly transmitting packets 340-1-B and 340-$n$-B to RAN node 105, an appliance 117 may avoid delay, including inter-device link delay, accounted for by configured offset value 415, and thus may avoid buffered packets 340-1-B and 340-$n$-B being deemed non-useful, which may occur if the appliance determines to relay the packets to RAN node 105 via XR processing unit 115.

PDU(s)/packet(s) corresponding to a remaining delay budget that is less than a total delay 405 may be deemed non-useful by an XR server that is part of core network 130, or by the serving RAN node 105, if the XR appliance determines to relay the PDU(s)/packet(s) via XR processing unit 115, which may be a preferred mode to transmit buffered traffic packets from XR appliance 117 to RAN node 105 if the buffered packets correspond to a remaining delay budget that exceeds total delay value 405. If a buffered traffic packet cannot be transmitted directly from appliance 117 to RAN node 105 in satisfaction of a corresponding delay budget 425, and thus will likely be deemed non-useful, transmission of the packet may be skipped to avoid wasting of uplink radio interface resources to accommodate the transmission.

On condition of a determined worst/smallest PDU remaining delay budget of multiple LCGs being less than or equal the total delay 405, which may comprise a sum of determined device-specific transmission delay 410 and configured PDU pre-discarding offset 415, (e.g., remaining delay budget 420-1-B is less than delay 405), end XR appliance 117 may compile a partial buffer status report ("BSR") 320, which may comprise at least one logical channel group volume indication 510 indicative of at least one packet that has been buffered in a memory corresponding to the appliance. One or more logical channel group volume indication(s) 505 may be indicative of one or more respective volume(s) of buffered traffic corresponding only to LCGs, identified by one or more identifiers 510, with respect to which PDUs/packets have a remaining delay budget less than or equal a total delay 405. In the example shown in FIG. 5, indications 510A and 510$n$ indicate, respectively, LCG1 and LCGn, which are associated with packets corresponding to remaining delay budgets that are less than delay 405.

Responsive to transmitting of a partial buffer status report 320, a scheduled uplink resource message 330 may be received that comprises at least one uplink resource indication indicative of at least one uplink resource, usable by appliance 117, to facilitate transmitting of at least one packet corresponding to a traffic volume indicated in the partial buffer status report to radio network node 105. End XR appliance 117 may receive scheduled uplink resource message 330 that comprises one or more uplink scheduling grant(s) that are usable to transmit one or more volume(s) of traffic indicated in partial BSR report 320 by one or more indications 505.

End XR appliance 117 may directly transmit one or more PDUs/packets that correspond to the traffic volume(s) indicated by indication(s) 505 in partial BSR report 320. Accordingly, undesirable skipping of transmission of PDUs/packets may be minimized while allowing one or more appliances 117 to skip transmission of packets corresponding to one or more appliances, traffic flows, or LCGs associated with the one or more XR appliances 117. Avoiding transmission of packets that that have already violated, or will likely soon violate, respective latency targets, may avoid overwhelming of uplink radio interface resources with transmission of non-useful PDUs/packets.

End XR appliance 117 may transmit a partial BSR report, either directed towards the serving RAN node or directed towards the XR processing unit. A partial BSR report 320 may facilitate quick scheduling of uplink resources that may be sufficient to accommodate direct transmission of buffered packets, with respect to which expiration of corresponding delay budget(s) may be imminent, by XR appliance 117 to RAN node 105 instead of the appliance relaying the packets via an XR processing unit 115.

Unlike with conventional techniques, which require PDU/packet discarding solely based on respective buffering delay(s), embodiments disclosed herein may facilitate discarding of PDU(s)/packet(s) based on corresponding respective buffering delay(s) and a preset value that accounts for inter-device delay conditions. Unlike with conventional techniques, according to which transmission of buffered uplink traffic may be performed based on statistical analysis cither directly to a serving RAN node or relayed through an intermediate processing unit, embodiments disclosed herein facilitate transmission of uplink packets, cither directly or via relay, based on real-time-determined, or configured, PDU skipping and delay conditions. Conventional existing BSR reporting modes comprise either long BSRs or short BSRs that have static and pre-defined structure for reporting LCGs corresponding to volumes of buffered traffic. Embodiments disclosed herein may facilitate use of a partial BSR to dynamically select and report only a portion of LCGs associated with buffered traffic based on which LCG corresponds to a soon-to-be-violated target delay budgets, which embodiments may be referred to as delay-aware dynamic BSR selection and reporting.

Figure 6:
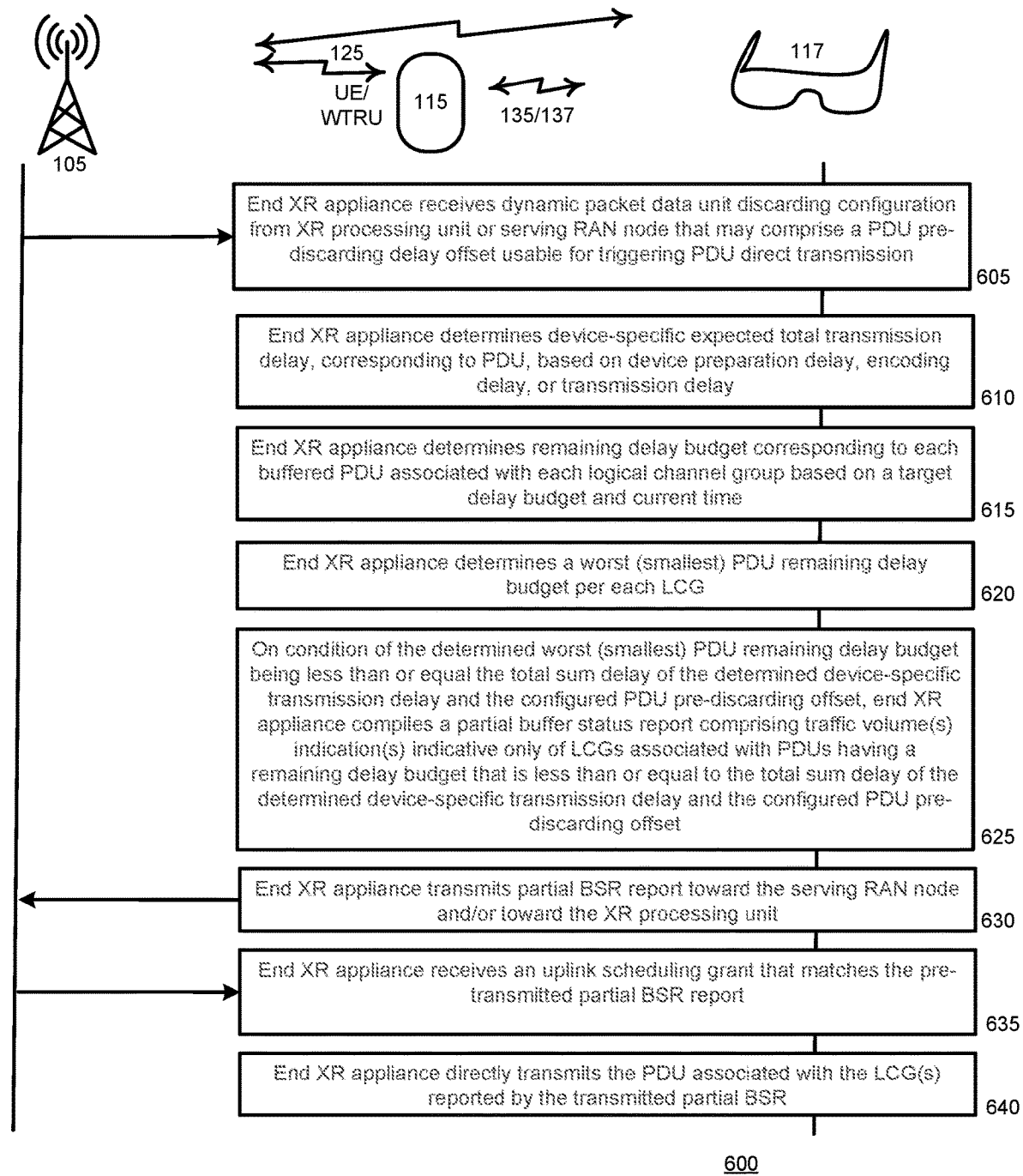
FIG. 6 illustrates timing diagram of an example embodiment of an extended reality appliance transmitting a partial buffer status report indicative of buffered traffic corresponding to imminent violation of a delay budget.

Turning now to FIG. 6, the figure illustrates a timing diagram of an example embodiment method 600 to facilitate end XR appliance 117 determining whether to transmit a traffic packet directly to RAN node 105 or via relay by XR processing unit 115. At act 605, end XR appliance 117 may receive a dynamic protocol data unit discarding configuration, either from XR processing unit 115 or from serving RAN node 105. It will be appreciated that appliance 117 shown in FIG. 6 may represent more than one appliance 117. Appliances represented by appliance 117 shown in FIG. 6 may use XR processing unit 115 to relay traffic with RAN node 105. A protocol data unit discarding configuration may comprise a pre-discarding delay offset that may be usable for triggering determining whether to directly transmit uplink traffic buffered by appliance 117, which traffic may correspond to, or may be associated with, one or more logical channel groups that may be active with respect to one or more appliances 117 and which traffic may be eligible for transmission via processing unit 115.

At act 610, end XR appliance 117 may calculate or determine a device-specific expected transmission delay (e.g., delay 410 shown in FIG. 4) corresponding to a packet buffered in a buffer corresponding to the appliance. Delay 410 may comprise preparation delay imposed by appliance 117, encoding delay imposed by appliance 117, or transmission delay corresponding to time to transmit, by the appliance, traffic directly to RAN node 105. At act 615, end XR appliance 117 may calculate or determine a remaining delay budget corresponding to each of one or more buffered PDU(s)/packet(s) by subtracting one or more current buffering delay values respectively corresponding to the buffered traffic PDU(s)/packet(s) from a target delay budget associated one or more logical channel group(s) associated with the buffered traffic. At act 620, end XR appliance 117 may determine a worst/smallest PDU/packet remaining delay budget corresponding to each LCG. At act 625, on condition of the determined worst/smallest PDU/packet remaining delay budget of the one or more remaining delay budgets being less than or equal to a sum of a determined device-specific transmission delay 410 and configured PDU pre-discarding offset 415, end XR appliance 117 may compile a partial buffer status reporting that may comprise one or more buffered traffic volume indication(s) indicative of only volumes of buffered traffic (e.g., buffered at an appliance 117) corresponding to logical channel groups with respect to which respective remaining delay budgets are less than total delay 405, which may comprise delay 410 determined at act 610 and offset 415 configured at act 605. At act 630, end XR appliance 117 may transmit a partial BSR report towards either serving RAN node 105 or towards XR processing unit 115. At act 635, end XR appliance 117 may receive an uplink scheduling grant message that comprises an indication of one or more uplink resource(s) that may accommodate transmission of buffered traffic indicated by the partial BSR report transmitted at act 630. At act 640, end XR appliance 117 may directly transmit to RAN node 105 PDU(s)/packet(s) corresponding to logical channel groups indicated in the partial buffer status report.

Figure 7:
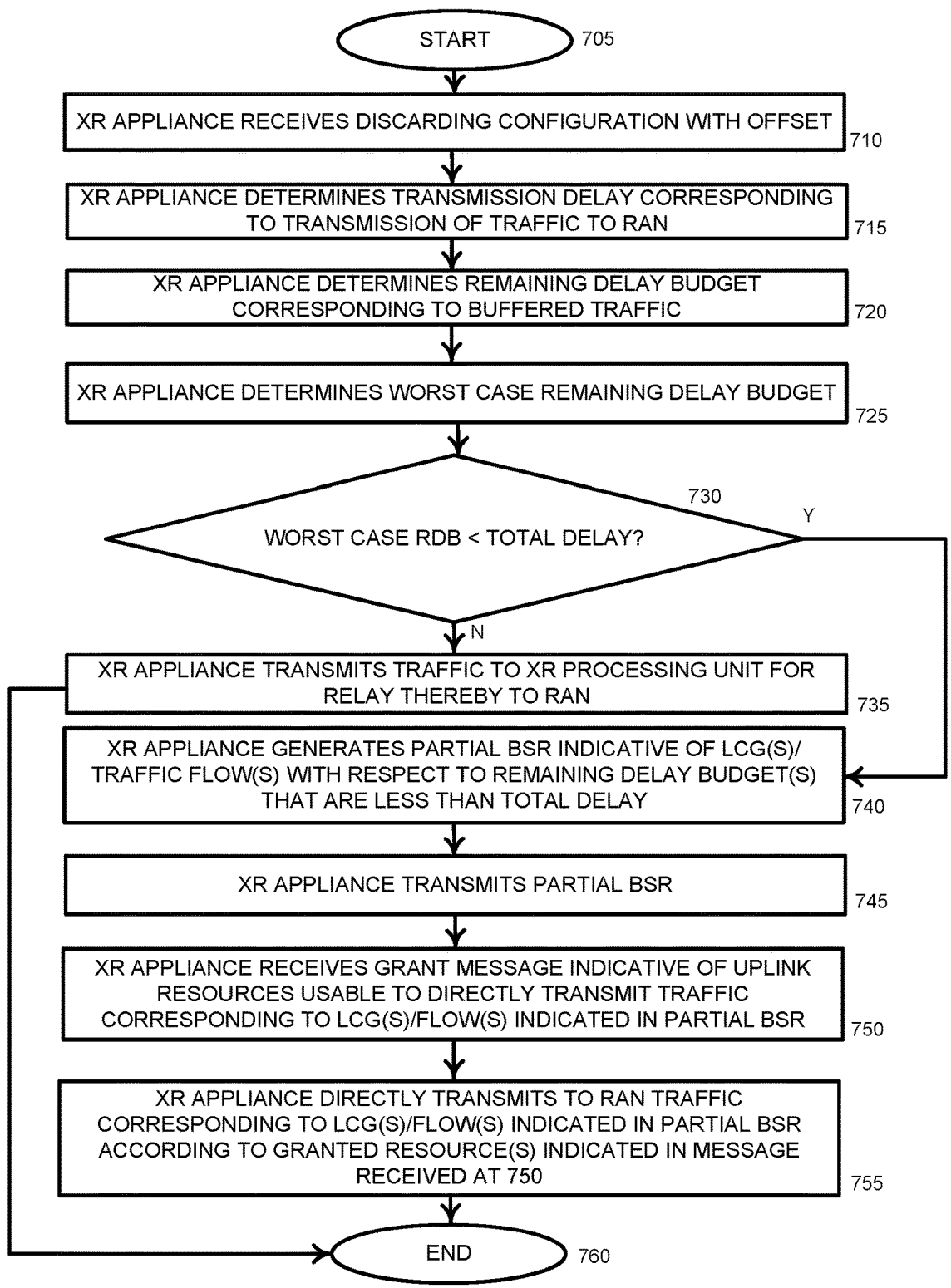
FIG. 7 illustrates a flow diagram of an example embodiment method of an extended reality appliance determining whether to transmit a traffic packet directly or via relay by an extended reality processing unit.

Turning now to FIG. 7, the figure illustrates a flow diagram of an example embodiment 700. Method 700 begins at act 705. At act 710, an XR appliance, for example appliance 117 described in reference to FIG. 3, may receive a discarding configuration. The XR appliance may receive the discarding configuration from a serving radio access network node or from an XR processing unit that the appliance may use to relay traffic between the appliance and the radio access network node. The discarding configuration may comprise a pre-discarding delay offset, which may be usable to determine whether to transmit a buffered packet directly to the radio access network node or to the XR the processing unit for relaying thereby to the radio access network node. A pre-discarding delay offset may be configured with respect to each of one or more logical channel group(s) associated with the appliance or a pre-discarding offset may be common to multiple logical channel groups associated with a current XR communication session being facilitated by the appliance and/or by the processing unit. The pre-discarding delay offset may comprise a value that relates to, accounts for, encompasses, or otherwise corresponds to an amount of time, or a delay, to transmit a buffered traffic packet from the appliance to the processing unit for relaying thereby to the radio access network node. Insofar as interlink delay between an XR appliance and an XR processing unit may not substantially vary from transmission of one buffered packet to another, the pre-discarding delay offset may be substantially semi-static.

At act 715, the XR appliance may determine a transmission delay, which may be referred to as a determined direct transmission time, corresponding to transmission of a buffered traffic packet by the appliance to the radio access network node without the buffered traffic packet being relayed to the radio access network node via the XR processing unit. At act 720, the XR appliance may determine a remaining delay budget corresponding to a packet buffered by the appliance. The remaining delayed budget corresponding to the buffered packet may be determined by analyzing a current buffered time, or amount, associated with the buffered packet with respect to a delay budget corresponding to the buffered packet. The current buffered time associated with the buffered packet may be an amount of time since the packet was generated. Thus, the remaining delay budget may be a difference between a time in the future at which the buffer packet will no longer be useful, for example by XR server equipment that may be coupled with core network equipment, and the determined current buffer time. The delay budget corresponding to the buffered packet may be based on a quality of service associated with a traffic flow, or logical channel group, to which the buffered packet corresponds. At act 725, the XR appliance may determine a worst-case remaining delay budget with respect to one or more logical channel groups, or traffic flows, corresponding to the XR appliance. A worst-case remaining delay budget may be a remaining delay budget, from among multiple remaining delay budgets respectively corresponding to multiple logical channel groups, with respect to which expiration of an associated delayed budget is the most imminent. For example, out of first, second, and third remaining delay budgets respectively corresponding to first, second, and third logical channel groups, if a difference between a second delay budget and a second current delay time corresponding to the second channel group is a shortest, or smallest, remaining delayed budget with respect to remaining delayed budgets corresponding to the first and third logical channel groups, the XR appliance may determine at act 725 the second remaining delay budget as the worst case remaining delay budget.

At act 730, the XR appliance may analyze the determined worst case remaining delay budget with respect to a total delay value (e.g., delay 405 shown in FIG. 4), which may be based on the offset received in configuration at act 710 and the transmission delay determined at act 715. The total delay value may comprise a sum of the offset received in the configuration at act 710 and the transmission delay determined at act 715. The XR appliance may determine at act 730 whether the determined worst case remaining delay budget exceeds the total delay value. If a determination is made at act 730 that the determined worst-case remaining delayed budget is not less than the total delay value, method 700 may advance to act 735. At act 735, the XR appliance may transmit buffered traffic packets corresponding to a logical channel group associated with the worst-case remaining delay budget to an XR processing unit for relay thereby to the radio access network node, and method 700 may then advance to act 760 and end.

Returning to description of act 730, if a determination is made that the worst-case remaining delay budget determined at 725 does not to exceed the direct transmission time, determined at act 715, summed with the pre-discarding delay offset received in the configuration at act 710, the XR appliance may determine to avoid transmitting the at least one protocol data unit to the XR processing unit for relay thereby to the radio access network node. Thus, if relaying of a buffered traffic packet to the radio access network node via the XR processing unit would cause the buffered traffic packet to arrive later than required by a delay budget corresponding to the buffer traffic packet due to interlink delay associated with transmitting the buffer traffic packet from the XR appliance to the XR processing unit, the XR appliance may determine to bypass relaying, by the XR processing unit, of the buffered packet and may determine to transmit the buffered traffic packet directly to the radio access network node.

After determining at act 730 that the worst case remaining delayed budget determined at act 725 is less than the total delay value that is based on the offset received in the configuration at act 710, the XR appliance may generate a partial buffer status report at act 740. The partial buffer status report generated at act 740 may be indicative of one or more logical channel groups with respect to which the XR appliance has determined remaining delay budgets corresponding to packets buffered in a buffer associated with the appliance that are less than the direct transmission time, determined at act 715, summed with the pre-discarding delay offset received in the configuration at act 710. The partial buffer status report may comprise logical channel group identifiers, or traffic flow identifiers associated with logical channel groups. The partial buffer status report may comprise traffic volume indications, which may comprise buffer status reporting indices associated in a buffer status report table with one or more traffic volumes. Thus, a partial buffer status report may comprise one or more traffic volume indications/indices associated in the partial buffer status report with corresponding traffic flow identifiers or logical channel group identifiers. Accordingly, instead of transmitting a buffer status report that indicates to a serving radio access network node all traffic buffered in a buffer corresponding to the XR appliance, the XR appliance may transmit, at act 745, a partial buffer status report that only indicates traffic volume, or traffic volumes, corresponding to traffic flows, or logical channel groups, with respect to which expiration of respective remaining delay budgets may be imminent and with respect to which the buffer traffic volume(s) would likely be deemed non-useful if the XR appliance were to transmit the buffered traffic volume(s) to an XR processing unit for relaying thereby to the radio access network node. Transmission of a partial buffer status may facilitate receiving a grant of uplink resources usable to transmit traffic associated with an imminently expiring delay budget but not usable to transmit buffered traffic with respect to which expiration of an associated delayed budget is not imminent and with respect to which the associated delay budget can likely be satisfied by relaying of the buffer traffic via the XR processing unit. Accordingly, the XR appliance can continue to use the XR processing unit to relay buffered traffic to the radio access network node if such relaying is not likely to result in the relayed traffic being deemed non-useful, and the XR appliance can receive a grant of uplink resources to accommodate direct transmission of buffered traffic with respect to which expiration of an associated delay budget is imminent and cannot likely be satisfied by relaying via the XR processing unit.

At act 750, responsive to transmitting the partial buffer status report at act 745, the XR appliance may receive a scheduled uplink resource message indicative of uplink resources that may be usable to directly transmit, to the serving radio access network node, buffered traffic corresponding to logical channel groups or traffic flows indicated in the partial buffer status report. At act 755, the XR appliance may transmit directly to the serving radio access network node buffered traffic, corresponding to logical channel groups or traffic flows indicated in the partial buffer status report, according to one or more uplink resources indicated in the grant message received at act 750. Method 700 advances to act 760 and ends.

Figure 8:
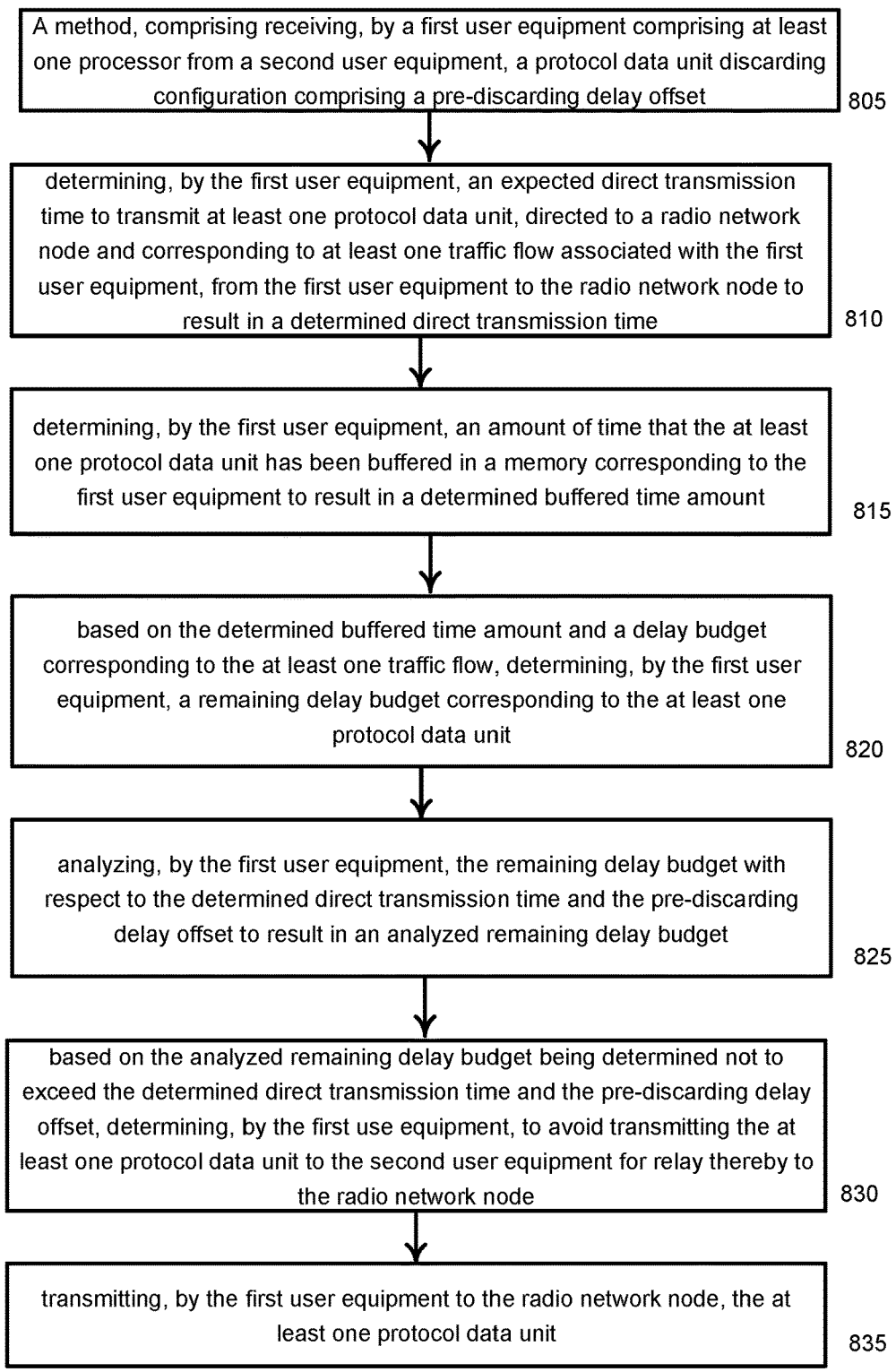
FIG. 8 illustrates a block diagram of an example method embodiment.

Turning now to FIG. 8, the figure illustrates an example embodiment method 800 comprising at block 805 receiving, by a first user equipment comprising at least one processor from a second user equipment, a protocol data unit discarding configuration comprising a pre-discarding delay offset;

at block 810 determining, by the first user equipment, an expected direct transmission time to transmit at least one protocol data unit, directed to a radio network node and corresponding to at least one traffic flow associated with the first user equipment, from the first user equipment to the radio network node to result in a determined direct transmission time; at block 815 determining, by the first user equipment, an amount of time that the at least one protocol data unit has been buffered in a memory corresponding to the first user equipment to result in a determined buffered time amount; at block 820 based on the determined buffered time amount and a delay budget corresponding to the at least one traffic flow, determining, by the first user equipment, a remaining delay budget corresponding to the at least one protocol data unit; at block 825 analyzing, by the first user equipment, the remaining delay budget with respect to the determined direct transmission time and the pre-discarding delay offset to result in an analyzed remaining delay budget; at block 830 based on the analyzed remaining delay budget being determined not to exceed the determined direct transmission time and the pre-discarding delay offset, determining, by the first use equipment, to avoid transmitting the at least one protocol data unit to the second user equipment for relay thereby to the radio network node; and at block 835 transmitting, by the first user equipment to the radio network node, the at least one protocol data unit.

Figure 9:
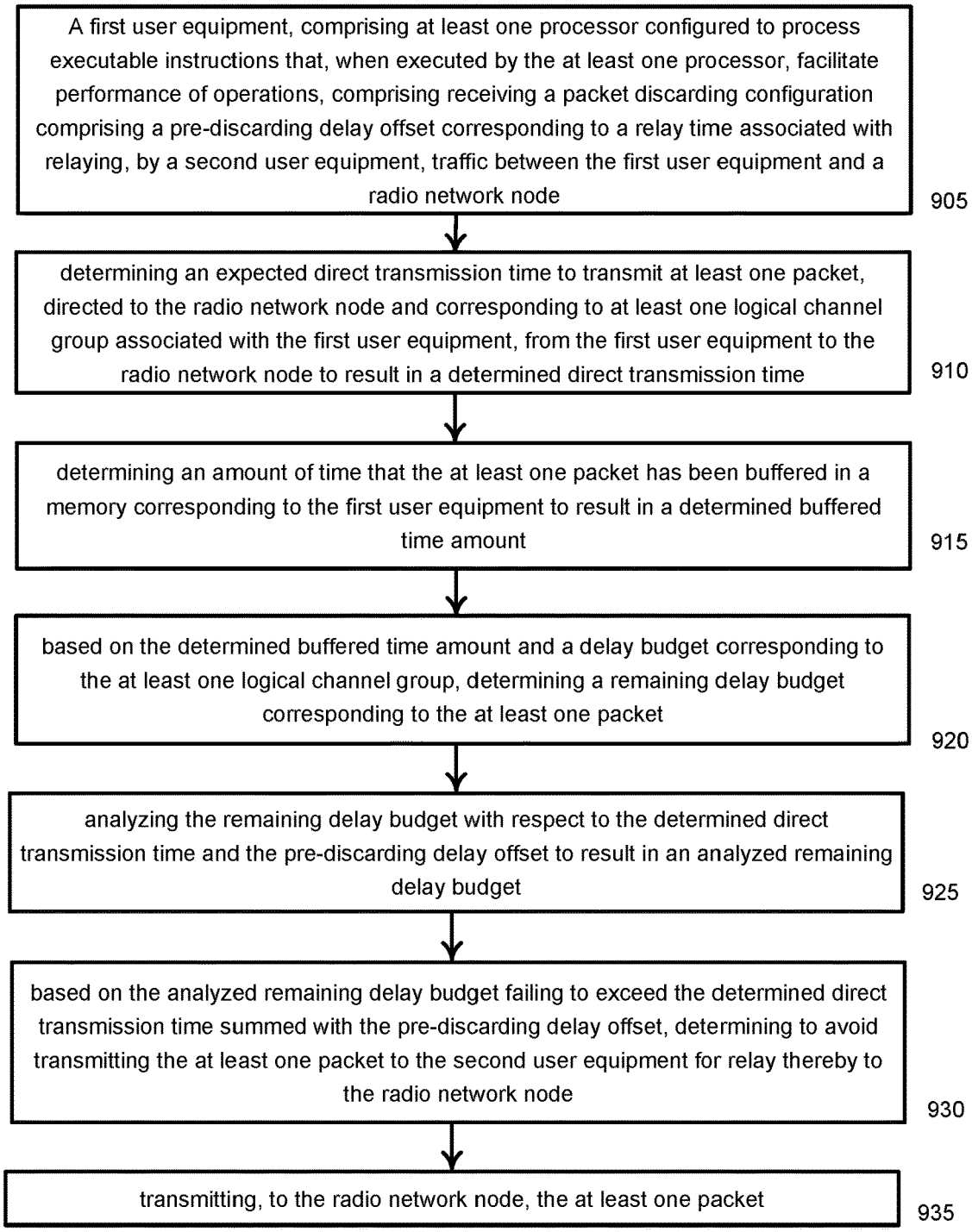
FIG. 9 illustrates a block diagram of an example extended reality appliance.

Turning now to FIG. 9, the figure illustrates a first user equipment, comprising at block 905 at least one processor configured to process executable instructions that, when executed by the at least one processor, facilitate performance of operations, comprising receiving a packet discarding configuration comprising a pre-discarding delay offset corresponding to a relay time associated with relaying, by a second user equipment, traffic between the first user equipment and a radio network node; at block 910 determining an expected direct transmission time to transmit at least one packet, directed to the radio network node and corresponding to at least one logical channel group associated with the first user equipment, from the first user equipment to the radio network node to result in a determined direct transmission time; at block 915 determining an amount of time that the at least one packet has been buffered in a memory corresponding to the first user equipment to result in a determined buffered time amount; at block 920 based on the determined buffered time amount and a delay budget corresponding to the at least one logical channel group, determining a remaining delay budget corresponding to the at least one packet; at block 925 analyzing the remaining delay budget with respect to the determined direct transmission time and the pre-discarding delay offset to result in an analyzed remaining delay budget; at block 930 based on the analyzed remaining delay budget failing to exceed the determined direct transmission time summed with the pre-discarding delay offset, determining to avoid transmitting the at least one packet to the second user equipment for relay thereby to the radio network node; and at block transmitting, to the radio network node, the at least one packet.

Figure 10:
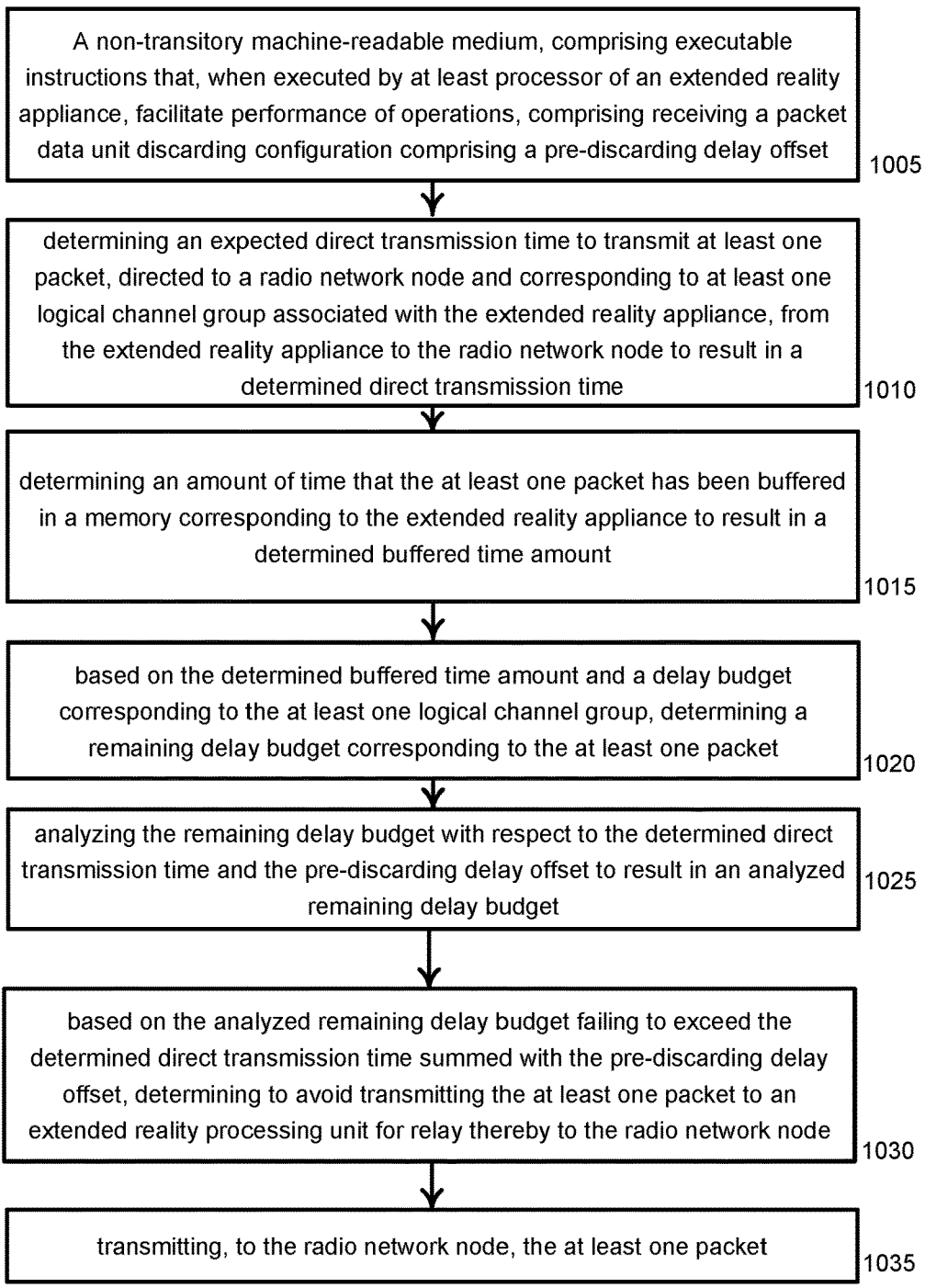
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by at least one processor of an extended reality appliance, facilitate performance of operations, comprising, receiving a packet data unit discarding configuration comprising a pre-discarding delay offset; at block 1010 determining an expected direct transmission time to transmit at least one packet, directed to a radio network node and corresponding to at least one logical channel group associated with the extended reality appliance, from the extended reality appliance to the radio network node to result in a determined direct transmission time; at block 1015 determining an amount of time that the at least one packet has been buffered in a memory corresponding to the extended reality appliance to result in a determined buffered time amount; at block 1020 based on the determined buffered time amount and a delay budget corresponding to the at least one logical channel group, determining a remaining delay budget corresponding to the at least one packet; at block 1025 analyzing the remaining delay budget with respect to the determined direct transmission time and the pre-discarding delay offset to result in an analyzed remaining delay budget; at block 1030 based on the analyzed remaining delay budget failing to exceed the determined direct transmission time summed with the pre-discarding delay offset, determining to avoid transmitting the at least one packet to an extended reality processing unit for relay thereby to the radio network node; and at block 1035 transmitting, to the radio network node, the at least one packet.

Figure 11:
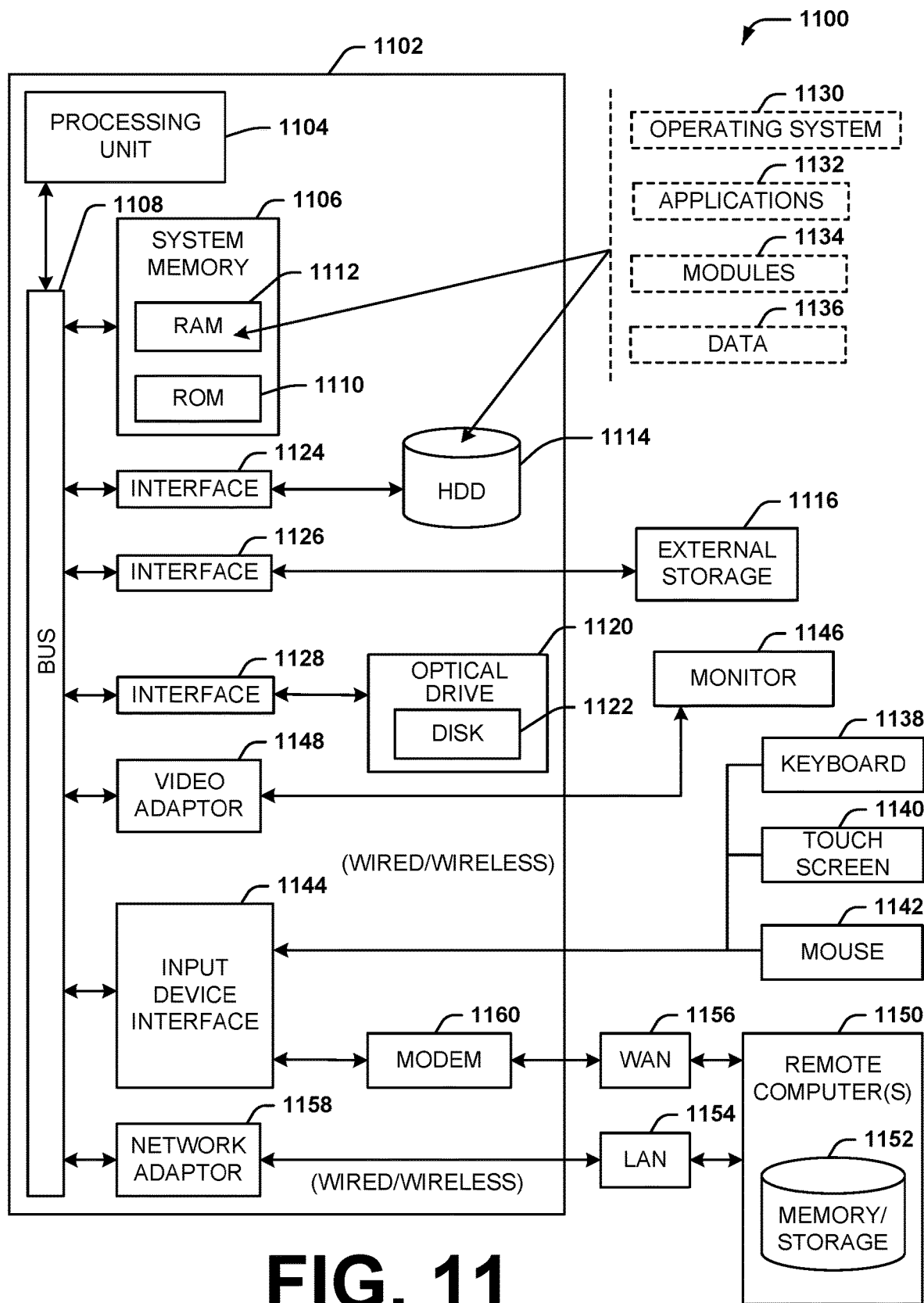
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
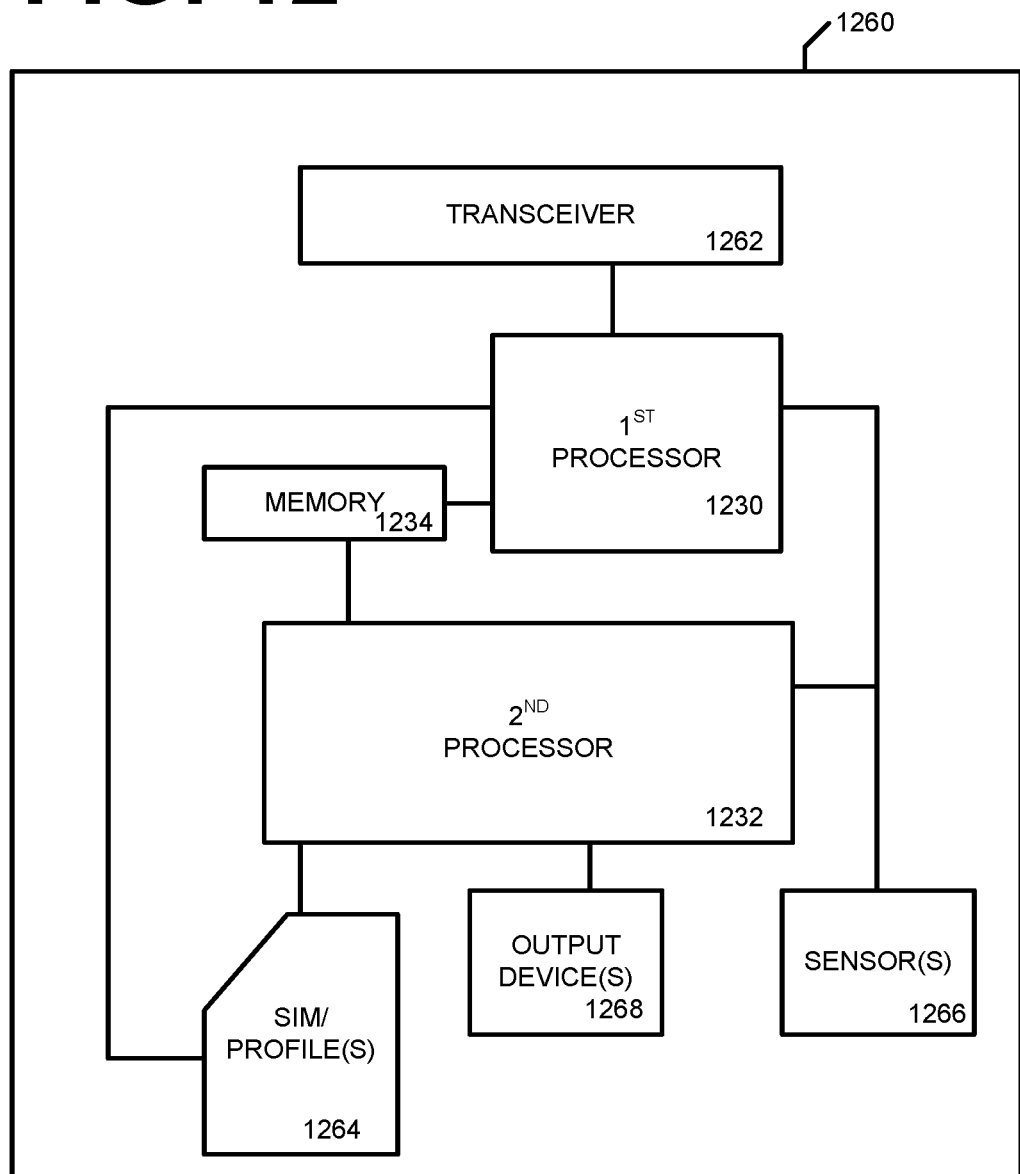
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |

TABLE 1-continued

| Term | Definition |
| --- | --- |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a first user equipment comprising at least one processor from a second user equipment, a protocol data unit discarding configuration comprising a pre-discarding delay offset;
determining, by the first user equipment, an expected direct transmission time to transmit at least one protocol data unit, directed to a radio network node and corresponding to at least one traffic flow associated with the first user equipment, from the first user equipment to the radio network node to result in a determined direct transmission time;
determining, by the first user equipment, an amount of time that the at least one protocol data unit has been buffered in a memory corresponding to the first user equipment to result in a determined buffered time amount;
based on the determined buffered time amount and a delay budget corresponding to the at least one traffic flow, determining, by the first user equipment, a remaining delay budget corresponding to the at least one protocol data unit;
analyzing, by the first user equipment, the remaining delay budget with respect to the determined direct transmission time and the pre-discarding delay offset to result in an analyzed remaining delay budget;
based on the analyzed remaining delay budget being determined not to exceed the determined direct transmission time and the pre-discarding delay offset, determining, by the first use equipment, to avoid transmitting the at least one protocol data unit to the second user equipment for relay thereby to the radio network node; and
transmitting, by the first user equipment to the radio network node, the at least one protocol data unit.

2. The method of claim 1, wherein the pre-discarding delay offset is based on a relay delay corresponding to relaying, by the second user equipment, of traffic between the first user equipment and the radio network node.

3. The method of claim 1, further comprising:
determining, by the first user equipment:
a preparation delay corresponding to preparing, by the first user equipment, the at least one protocol data unit for transmission,
an encoding delay corresponding to encoding, by the first user equipment, the at least one protocol data unit, and
a transmission delay, corresponding to transmitting, by the first user equipment, the at least one protocol data unit to the radio network node,
wherein the expected direct transmission time is based on at least one of the preparation delay, the encoding delay, or the transmission delay.

4. The method of claim 1, wherein the first user equipment is an extended reality appliance, and wherein the second user equipment is an extended reality processing unit configured: to facilitate relaying of traffic directed to the radio network node by the first user equipment or to facilitate relaying of traffic directed to the first user equipment by the radio network node.

5. The method of claim 1, wherein the at least one protocol data unit comprises a first protocol data unit corresponding to a first traffic flow of the at least one traffic flow, wherein the delay budget is a first delay budget, wherein the remaining delay budget is a first remaining delay budget, wherein the analyzed remaining delay budget is a first analyzed remaining delay budget, and wherein the determined buffered time amount is a first determined buffered time amount, the method further comprising:
determining, by the first user equipment, a second amount of time that a second protocol data unit, corresponding to a second traffic flow of the at least one traffic flow, has been buffered in the memory to result in a second determined buffered time amount;
based on the second determined buffered time amount and a second delay budget corresponding to the second traffic flow, determining, by the first user equipment, a second remaining delay budget corresponding to the second protocol data unit;
analyzing, by the first user equipment, the second remaining delay budget with respect to the determined direct transmission time and the pre-discarding delay offset to result in a second analyzed remaining delay budget;
based on the second analyzed remaining delay budget being determined to equal or exceed the determined direct transmission time and the pre-discarding delay offset, determining, by the first user equipment, to transmit the second protocol data unit to the second user equipment for relay thereby to the radio network node; and
transmitting, by the first user equipment to the second user equipment, the second protocol data unit.

6. The method of claim 5, wherein the first delay budget corresponds to a first quality-of-service associated with the first traffic flow, wherein the second delay budget corresponds to a second quality-of-service associated with the second traffic flow, and wherein the first delay budget and the second delay budget are different.

7. The method of claim 5, wherein the pre-discarding delay offset used in the analyzing of the first remaining delay budget with respect to the determined direct transmission time to result in the first analyzed remaining delay budget is a first pre-discarding delay offset, wherein the pre-discarding delay offset used in the analyzing of the second remaining delay budget with respect to the determined direct transmission time to result in the second analyzed remaining delay budget is a second pre-discarding delay offset, wherein the first pre-discarding delay offset corresponds to a first quality-of-service associated with the first traffic flow, and wherein the second pre-discarding delay offset corresponds to a second quality-of-service associated with the second traffic flow.

8. The method of claim 5, further comprising:

based on the analyzed remaining delay budget being determined not to equal or exceed the determined direct transmission time and the pre-discarding delay offset, directing, by the first user equipment to the radio network node, a partial buffer status report comprising at least one traffic flow volume indication indicative of at least the first protocol data unit or the second protocol data unit that have been buffered in the memory; and responsive to the transmitting of the partial buffer status report, receiving, by the first user equipment, a scheduled uplink resource message comprising at least one first uplink resource indication indicative of at least one first uplink resource, usable by the first user equipment, to facilitate the transmitting of the first protocol data unit to the radio network node.

9. The method of claim 1, further comprising:

based on the analyzed remaining delay budget being determined not to exceed the determined direct transmission time and the pre-discarding delay offset, transmitting, by the first user equipment to the radio network node, a partial buffer status report comprising a traffic flow volume indication indicative of the at least one protocol data unit that has been buffered in the memory; and responsive to the transmitting of the partial buffer status report, receiving, by the first user equipment from the radio network node, a scheduled uplink resource message comprising at least one uplink resource indication indicative of at least one uplink resource, usable by the first user equipment, to facilitate the transmitting of the at least one protocol data unit to the radio network node.

10. The method of claim 1, further comprising:

based on the analyzed remaining delay budget being determined not to exceed the determined direct transmission time and the pre-discarding delay offset, transmitting, by the first user equipment to the radio network node, a partial buffer status report comprising a traffic flow volume indication indicative of the at least one protocol data unit that has been buffered in the memory; and responsive to the transmitting of the partial buffer status report, receiving, by the first user equipment from the second user equipment, a scheduled uplink resource message comprising at least one uplink resource indication indicative of at least one uplink resource, usable by the first user equipment, to facilitate the transmitting of the at least one protocol data unit to the radio network node.

11. The method of claim 1, further comprising:

based on the analyzed remaining delay budget being determined not to exceed the determined direct transmission time and the pre-discarding delay offset, transmitting, by the first user equipment to the second user equipment, a partial buffer status report comprising a traffic flow volume indication indicative of the at least one protocol data unit that has been buffered in the memory; and responsive to the transmitting of the partial buffer status report, receiving, by the first user equipment from the radio network node, a scheduled uplink resource message comprising at least one uplink resource indication indicative of at least one uplink resource, usable by the first user equipment, to facilitate the transmitting of the at least one protocol data unit to the radio network node.

12. The method of claim 1, further comprising:

based on the analyzed remaining delay budget being determined not to exceed the determined direct transmission time and the pre-discarding delay offset, transmitting, by the first user equipment to the second user equipment, a partial buffer status report comprising a traffic flow volume indication indicative of the at least one protocol data unit that has been buffered in the memory; and responsive to the transmitting of the partial buffer status report, receiving, by the first user equipment from the second user equipment, a scheduled uplink resource message comprising at least one uplink resource indication indicative of at least one uplink resource, usable by the first user equipment, to facilitate the transmitting of the at least one protocol data unit to the radio network node.

13. A first user equipment, comprising:

at least one processor configured to process executable instructions that, when executed by the at least one processor, facilitate performance of operations, comprising:

receiving a packet discarding configuration comprising a pre-discarding delay offset corresponding to a relay time associated with relaying, by a second user equipment, traffic between the first user equipment and a radio network node;

determining an expected direct transmission time to transmit at least one packet, directed to the radio network node and corresponding to at least one logical channel group associated with the first user equipment, from the first user equipment to the radio network node to result in a determined direct transmission time;

determining an amount of time that the at least one packet has been buffered in a memory corresponding to the first user equipment to result in a determined buffered time amount;

based on the determined buffered time amount and a delay budget corresponding to the at least one logical channel group, determining a remaining delay budget corresponding to the at least one packet;

analyzing the remaining delay budget with respect to the determined direct transmission time and the pre-discarding delay offset to result in an analyzed remaining delay budget;

based on the analyzed remaining delay budget failing to exceed the determined direct transmission time summed with the pre-discarding delay offset, determining to avoid transmitting the at least one packet to the second user equipment for relay thereby to the radio network node; and transmitting, to the radio network node, the at least one packet.

14. The first user equipment of claim 13, wherein the packet discarding configuration is received from the second user equipment or the radio network node.

15. The first user equipment of claim 13, further comprising:

based on the analyzed remaining delay budget failing to exceed the determined direct transmission time summed with the pre-discarding delay offset, directing to the radio network node, a partial buffer status report comprising at least one logical channel group volume indication indicative of the at least one packet that has been buffered in the memory; and responsive to the transmitting of the partial buffer status report, receiving a scheduled uplink resource message comprising at least one uplink resource indication indicative of at least one uplink resource, usable by the first user equipment, to facilitate the transmitting of the at least one packet to the radio network node.

16. The first user equipment of claim 15, wherein the directing to the radio network node, a partial buffer status report comprises one of: transmitting to the partial buffer status report to the radio network node or transmitting the partial buffer status report to the second user equipment for relay thereby to the radio network node.

17. The first user equipment of claim 15, wherein the receiving of the scheduled uplink resource message comprises one of:
   receiving the scheduled uplink resource message from the radio network node; or
   receiving the scheduled uplink resource message from the second user equipment, and
   wherein the second user equipment receives the scheduled uplink resource message from the radio network node and relays the scheduled uplink resource message to the first user equipment.

18. A non-transitory machine-readable medium, comprising executable instructions that, when executed by at least processor of an extended reality appliance, facilitate performance of operations, comprising:
   receiving a packet data unit discarding configuration comprising a pre-discarding delay offset;
   determining an expected direct transmission time to transmit at least one packet, directed to a radio network node and corresponding to at least one logical channel group associated with the extended reality appliance, from the extended reality appliance to the radio network node to result in a determined direct transmission time;
   determining an amount of time that the at least one packet has been buffered in a memory corresponding to the extended reality appliance to result in a determined buffered time amount;
   based on the determined buffered time amount and a delay budget corresponding to the at least one logical channel group, determining a remaining delay budget corresponding to the at least one packet;
   analyzing the remaining delay budget with respect to the determined direct transmission time and the pre-discarding delay offset to result in an analyzed remaining delay budget;
   based on the analyzed remaining delay budget failing to exceed the determined direct transmission time summed with the pre-discarding delay offset, determining to avoid transmitting the at least one packet to an extended reality processing unit for relay thereby to the radio network node; and
   transmitting, to the radio network node, the at least one packet.

19. The non-transitory machine-readable medium of claim 18, wherein the at least one packet is a first packet corresponding to a first logical channel group of the at least one logical channel group, wherein the delay budget is a first delay budget, wherein the remaining delay budget is a first remaining delay budget, wherein the analyzed remaining delay budget is an analyzed first remaining delay budget, wherein the determined buffered time amount is a determined first buffered time amount, and wherein the operations further comprise:
   determining a second amount of time that a second packet, corresponding to a second logical channel group of the at least one logical channel group, has been buffered in the memory to result in a determined second buffered time amount;
   based on the determined second buffered time amount and a second delay budget corresponding to the second logical channel group, determining a second remaining delay budget corresponding to the second packet;
   analyzing the second remaining delay budget with respect to the determined direct transmission time and the pre-discarding delay offset to result in an analyzed second remaining delay budget;
   based on the analyzed second remaining delay budget failing to equal or exceed the determined direct transmission time summed with the pre-discarding delay offset, determining to avoid transmitting the second packet to the extended reality processing unit for relay thereby to the radio network node; and
   transmitting, to the radio network node, the second packet.

20. The non-transitory machine-readable medium of claim 19, wherein the operations further comprise:
   based on the analyzed first remaining delay budget or the analyzed second remaining delay budget failing to equal or exceed the determined direct transmission time summed with the pre-discarding delay offset, directing, to the radio network node, a partial buffer status report comprising at least one logical channel group volume indication indicative of at least the first packet or the second packet that have been buffered in the memory; and
   responsive to the transmitting of the partial buffer status report, receiving a scheduled uplink resource message comprising at least one first uplink resource indication indicative of at least one first uplink resource, usable by the extended reality appliance, to facilitate the transmitting of the first packet to the radio network node and comprising at least one second uplink resource indication indicative of at least one second uplink resource, usable by the extended reality appliance, to facilitate the transmitting of the second packet to the radio network node.

* * * * *